(12) United States Patent
Smith et al.

(10) Patent No.: US 8,215,694 B2
(45) Date of Patent: Jul. 10, 2012

(54) ATV HAVING ARRANGEMENT FOR A PASSENGER

(75) Inventors: Jeremy C. Smith, Chisago, MN (US); Richard D. Ripley, Rush, MN (US); Scott D. Taylor, Blaine, MN (US)

(73) Assignee: Polaris Industries Inc., Medina, MN (US)

( * ) Notice: Subject to any disclaimer, the term of this patent is extended or adjusted under 35 U.S.C. 154(b) by 164 days.

(21) Appl. No.: 12/246,948

(22) Filed: Oct. 7, 2008

(65) Prior Publication Data

US 2010/0084212 A1 Apr. 8, 2010

(51) Int. Cl.
*B60N 2/40* (2006.01)
*B60J 1/02* (2006.01)
*B62K 5/00* (2006.01)

(52) U.S. Cl. ............... 296/65.02; 180/210; 248/592; 297/196; 297/199

(58) Field of Classification Search ............ 248/560, 248/592, 594, 618, 631; 296/63, 65.01, 65.02; 297/195.1, 195.12, 196, 199, 312, 344.1, 297/344.15, 344.16; 180/210
See application file for complete search history.

(56) References Cited

U.S. PATENT DOCUMENTS

| 195,122 | A | * | 9/1877 | Guyer .......................... 248/592 |
|---|---|---|---|---|
| 1,082,423 | A | * | 12/1913 | Hartman ..................... 297/313 |
| 2,141,093 | A | | 12/1938 | Richter et al. |
| 2,284,352 | A | * | 5/1942 | Zank ............... 248/565 |
| 2,396,511 | A | | 3/1946 | Issigonis |
| 2,628,657 | A | | 2/1953 | Orrick, Jr. |
| 2,868,273 | A | | 1/1959 | Barrett |
| 2,984,290 | A | | 5/1961 | Miller |
| 3,167,298 | A | | 1/1965 | Senkowski et al. |
| 3,347,512 | A | | 10/1967 | Campbell |
| 3,736,020 | A | * | 5/1973 | Pilachowski et al. ........... 296/63 |
| 3,747,888 | A | * | 7/1973 | Heckett ......................... 248/562 |
| 3,841,696 | A | | 10/1974 | Wagner |
| 3,844,610 | A | * | 10/1974 | Adams ........................ 297/213 |
| 3,913,975 | A | * | 10/1975 | Carter ........................... 297/307 |

(Continued)

FOREIGN PATENT DOCUMENTS

DE 41 36 296 A1 5/1993

(Continued)

OTHER PUBLICATIONS

International Search Report and Written Opinion issued by the European Patent Office, dated Jan. 6, 2010, for PCT/US2009/059535; 10 pages.

(Continued)

*Primary Examiner* — Glenn Dayoan
*Assistant Examiner* — Paul Chenevert
(74) *Attorney, Agent, or Firm* — Faegre Baker Daniels LLP

(57) ABSTRACT

An ATV includes a removable passenger seat. The passenger seat is selectively added or removed from the ATV by way of a latch assembly. The passenger seat is supported by a pivot support link and a suspension coupling. The pivot support link and suspension coupling may be positioned rearward of a straddle-type seat for a driver. The entire pivot support link can be attached to the ATV in a dampened manner by way of the suspension coupling. The suspension coupling is comprised of at least one element acting in a linear direction and moving in at least a partially vertical travel component. The positioning of the suspension coupling provides greater vertical clearance, and therefore, maximum vertical stroke.

20 Claims, 19 Drawing Sheets

U.S. PATENT DOCUMENTS

| | | | |
|---|---|---|---|
| 3,927,854 A * | 12/1975 | Carey | 248/621 |
| 4,059,171 A | 11/1977 | Pakosh | |
| 4,062,585 A * | 12/1977 | Herring, Jr. | 297/195.1 |
| 4,129,198 A | 12/1978 | Hunter | |
| 4,198,092 A * | 4/1980 | Federspiel | 296/65.02 |
| 4,380,352 A * | 4/1983 | Diffrient | 297/61 |
| 4,521,053 A * | 6/1985 | de Boer | 297/312 |
| 4,527,831 A * | 7/1985 | Katsuoka | 297/243 |
| 4,563,038 A | 1/1986 | Hirose | |
| 4,662,597 A | 5/1987 | Uecker et al. | |
| 4,714,227 A | 12/1987 | Holm et al. | |
| 4,779,695 A | 10/1988 | Yasui | |
| 5,007,675 A | 4/1991 | Musto et al. | |
| 5,037,155 A * | 8/1991 | Holm et al. | 296/65.13 |
| 5,149,034 A | 9/1992 | Ganaja | |
| 5,309,861 A | 5/1994 | Mardikian | |
| 5,324,095 A | 6/1994 | Yamauchi | |
| 5,367,978 A | 11/1994 | Mardikian | |
| 5,458,213 A | 10/1995 | Nakaya et al. | |
| 5,509,496 A | 4/1996 | Erickson et al. | |
| 5,613,570 A | 3/1997 | Becker | |
| 5,618,021 A | 4/1997 | Brodersen | |
| 5,713,629 A | 2/1998 | Plackis | |
| 5,876,085 A | 3/1999 | Hill | |
| 6,007,150 A * | 12/1999 | Clerkin et al. | 297/215.12 |
| 6,102,466 A | 8/2000 | Kanazawa et al. | |
| 6,182,590 B1 | 2/2001 | Patera | |
| 6,276,653 B1 | 8/2001 | Traxler | |
| 6,354,556 B1 | 3/2002 | Ritchie et al. | |
| 6,460,818 B1 | 10/2002 | Garelick et al. | |
| 6,732,830 B2 | 5/2004 | Gagnon et al. | |
| 6,773,049 B2 | 8/2004 | Rupiper et al. | |
| 6,880,483 B2 | 4/2005 | Fedders | |
| 6,968,917 B2 | 11/2005 | Rondeau et al. | |
| 6,971,714 B1 | 12/2005 | Hanagan | |
| 7,008,015 B2 | 3/2006 | Bischoff | |
| 7,055,454 B1 | 6/2006 | Whiting et al. | |
| 7,121,371 B2 | 10/2006 | Rondeau et al. | |
| 7,258,192 B2 | 8/2007 | Davis et al. | |
| 7,331,418 B2 | 2/2008 | Audet | |
| 7,506,714 B2 | 3/2009 | Davis et al. | |
| 2002/0011745 A1 | 1/2002 | Petersen | |
| 2004/0026150 A1 | 2/2004 | Nishi et al. | |
| 2004/0029459 A1 | 2/2004 | Berthiaume et al. | |
| 2004/0031640 A1 | 2/2004 | Tweet | |
| 2004/0173653 A1 | 9/2004 | Audet | |
| 2005/0121953 A1 * | 6/2005 | Sprouse, II | 297/199 |
| 2005/0168018 A1 | 8/2005 | Cox | |
| 2005/0247506 A1 | 11/2005 | Rondeau et al. | |
| 2005/0275268 A1 | 12/2005 | Oomori | |
| 2006/0066122 A1 * | 3/2006 | Wiseman | 296/65.01 |
| 2006/0113139 A1 | 6/2006 | Nishi et al. | |
| 2007/0034435 A1 | 2/2007 | Berg et al. | |
| 2007/0262604 A1 | 11/2007 | Takei et al. | |
| 2007/0278026 A1 | 12/2007 | Davis et al. | |
| 2008/0217088 A1 | 9/2008 | Berg et al. | |
| 2009/0195035 A1 | 8/2009 | Ripley | |
| 2009/0236820 A1 | 9/2009 | Chang et al. | |
| 2010/0019524 A1 * | 1/2010 | Utke et al. | 296/65.02 |

FOREIGN PATENT DOCUMENTS

| | | | |
|---|---|---|---|
| DE | 19531985 A1 | | 3/1997 |
| DE | 10 2005 013610 A1 | | 9/2006 |
| EP | 1296036 A2 | | 3/2003 |
| GB | 159 650 A | | 3/1921 |
| GB | 1501631 A | | 2/1978 |
| JP | 06105727 A | * | 4/1994 |
| WO | WO 03/053769 | | 7/2003 |
| WO | WO 2008/100398 A | | 8/2008 |

OTHER PUBLICATIONS

International Preliminary Report on Patentability issued by the European Patent Office, dated Mar. 15, 2011, for PCT/US2009/059535; 6 pages.

The Council of the European Communities, "Council Directive on the approximation of the laws of the Member States relating to the driver's seat on wheeled agricultural or forestry tractors (78/764/EEC) (OJ L 255, 18.9, 1978)," Jul. 25, 1978, 69 pages, available at http://eur-lex.europa.eu/LexUriServ/LexUriServ.do?uri=CONSLEG:1978L0764:20070101:EN:PDF.

European Patent Office, International Search Report for PCT/US2009/049799, mailed on Feb. 24, 2010; 6 pages.

European Patent Office, Written Opinion of the International Searching Authority for PCT/US2009/049799, mailed on Feb. 24, 2010; 7 pages.

European Patent Office, International Preliminary report on Patentability for PCT/US2009/049799, completed on Jan. 27, 2011; 13 pages.

* cited by examiner

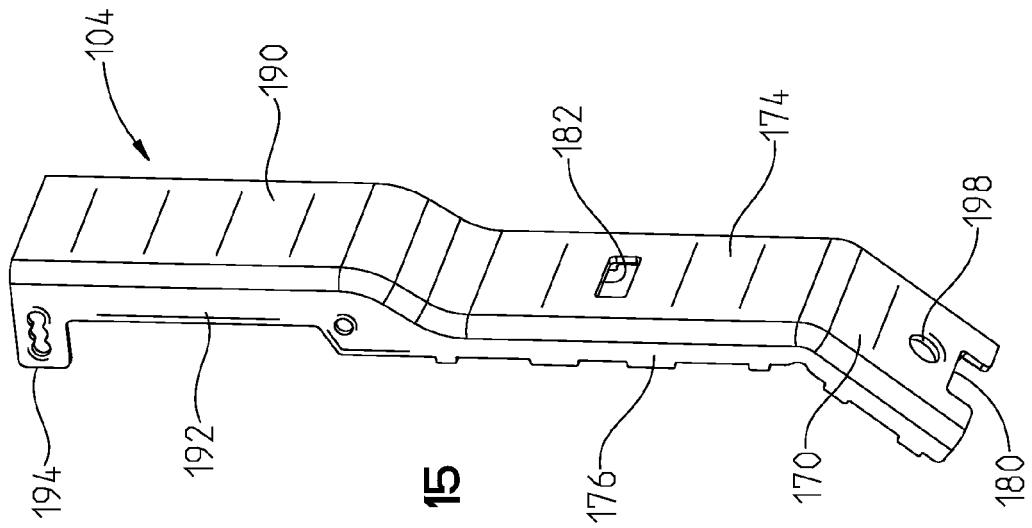
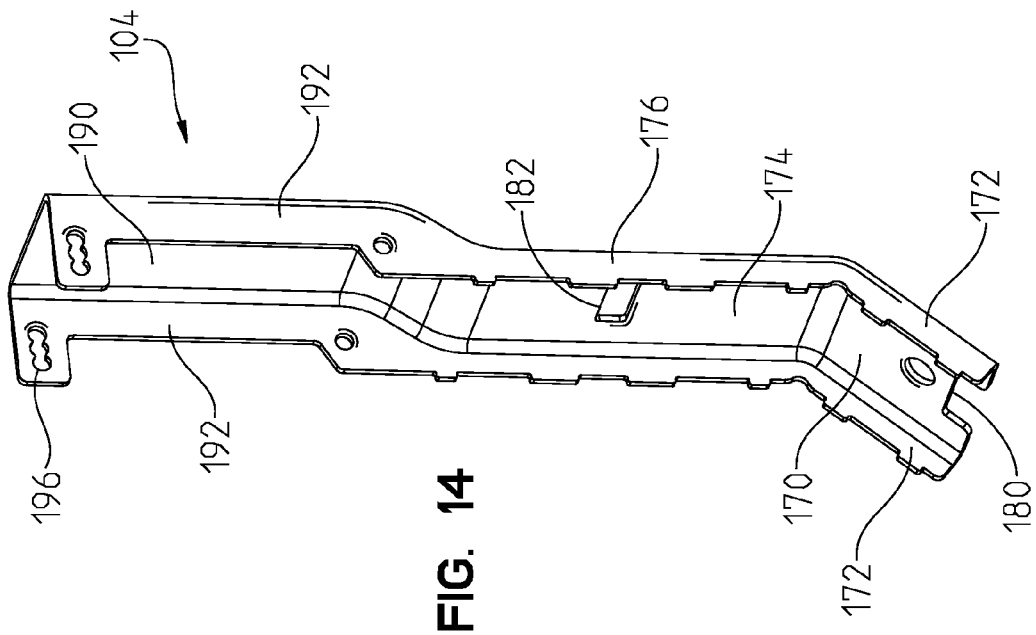

ATV HAVING ARRANGEMENT FOR A PASSENGER

RELATED APPLICATION

This application is related to application Ser. No. 12/012,587 filed Feb. 4, 2008, the subject matter of which is incorporated herein by reference.

FIELD OF THE INVENTION

The present disclosure relates to all-terrain vehicles (ATVs) and more particularly, for seating arrangements for a passenger on an ATV.

BACKGROUND AND SUMMARY

Generally, all terrain vehicles ("ATVs") and utility vehicles ("UVs") are used to carry one or two passengers and a small amount of cargo over a variety of terrains. Due to increasing recreational interest in ATVs, ATVs for multiple riders have become more popular in the market place. Most ATVs include an engine including between one and three cylinders. Most ATVs include a straddle or saddle type seat positioned above the engine. Seating systems for supporting people in a seated position on such vehicles, for example, on ATVs, are well-known. Most systems generally involve a straddle type seat being secured to a frame structure.

Conventional straddle type seats on recreational and utility vehicles generally hold a number of people, and most commonly, the seats function in supporting one or two persons. In one example, a two-person seating system is designed with an elongated bench portion of the straddle type seat so as to support one person in front of the other. In another example, discrete seats bottoms are provided for supporting one person in front of the other, with the passenger elevated in relation to the driver.

It is desirable on ATVs to provide the most comfortable and ergonomically pleasing ride for either one or two ATV riders. Embodiments of the invention can be used to generally overcome the above shortcomings as well as others.

According to an illustrative embodiment of the present disclosure, an all-terrain vehicle includes a frame, a straddle type seat mounted to the frame for a driver, a passenger seat positioned rearward of the straddle type seat and is movable in dampened movement in at least a partially vertical travel component.

In another embodiment, a vehicle comprises a frame, a straddle type seat mounted to the frame for a driver, and a passenger support assembly positioned rearward of the straddle type seat, where the passenger support assembly is comprised of a seat frame assembly and a seat assembly, wherein the seat frame assembly is pivotally movable relative to the vehicle frame and the seat assembly is removably mounted to the seat frame assembly.

In another embodiment, a vehicle comprises a frame; a straddle type seat mounted to the frame for a driver; and a passenger support assembly positioned rearward of the straddle type seat, where the passenger support assembly is comprised of a seat bottom and a seat back, the seat back being adjustably movable to a plurality of positions for the ergonomic comfort of the passenger.

BRIEF DESCRIPTION OF THE DRAWINGS

FIGS. 14 and 15 show inner and outer perspective views of the upper seat back frame;

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to an all terrain vehicle, it should be understood that the invention may have application to other types of vehicles, such as snowmobiles, motorcycles, watercraft, utility vehicles, scooters, golf carts, and mopeds.

Figure 1:
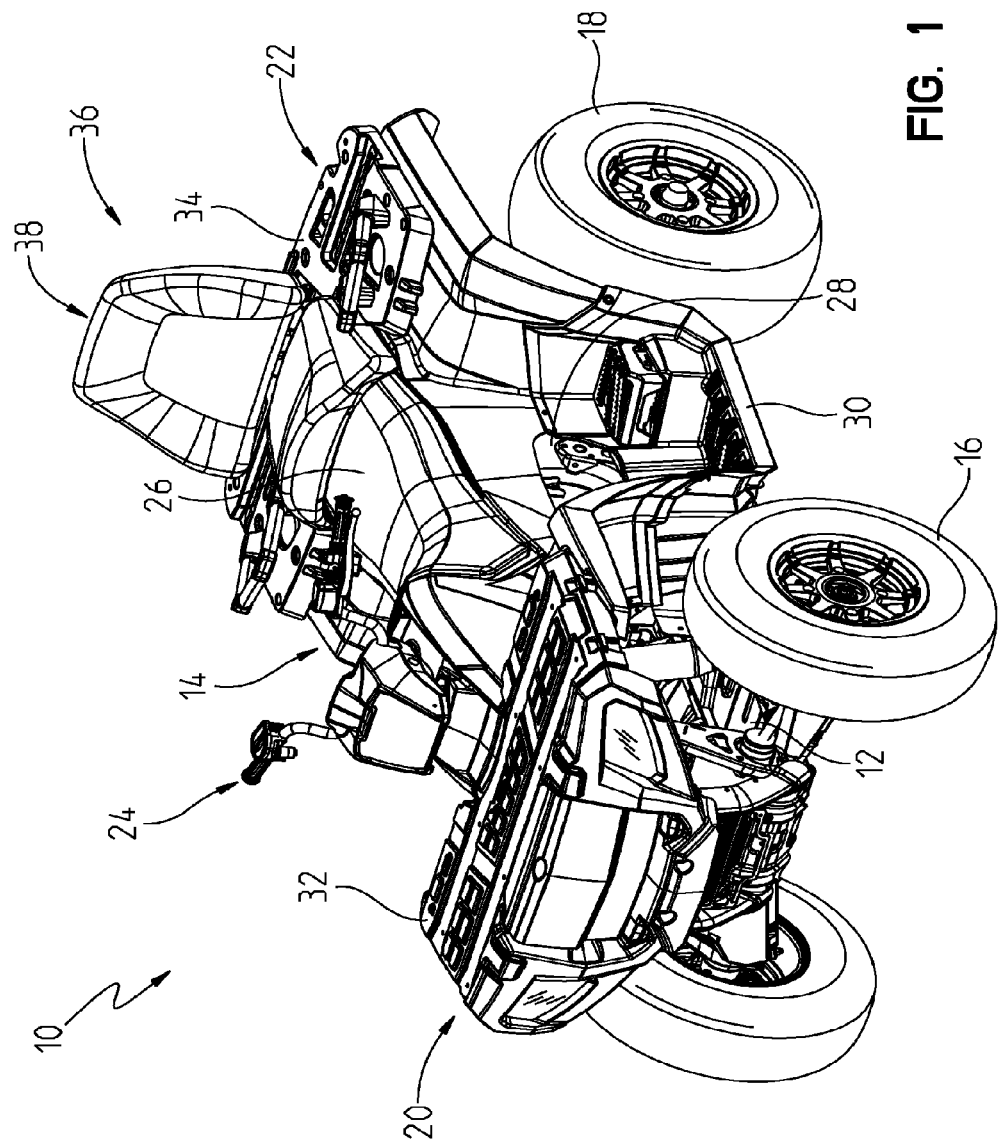
FIG. 1 is a front perspective view of vehicle described.
Figure 2:
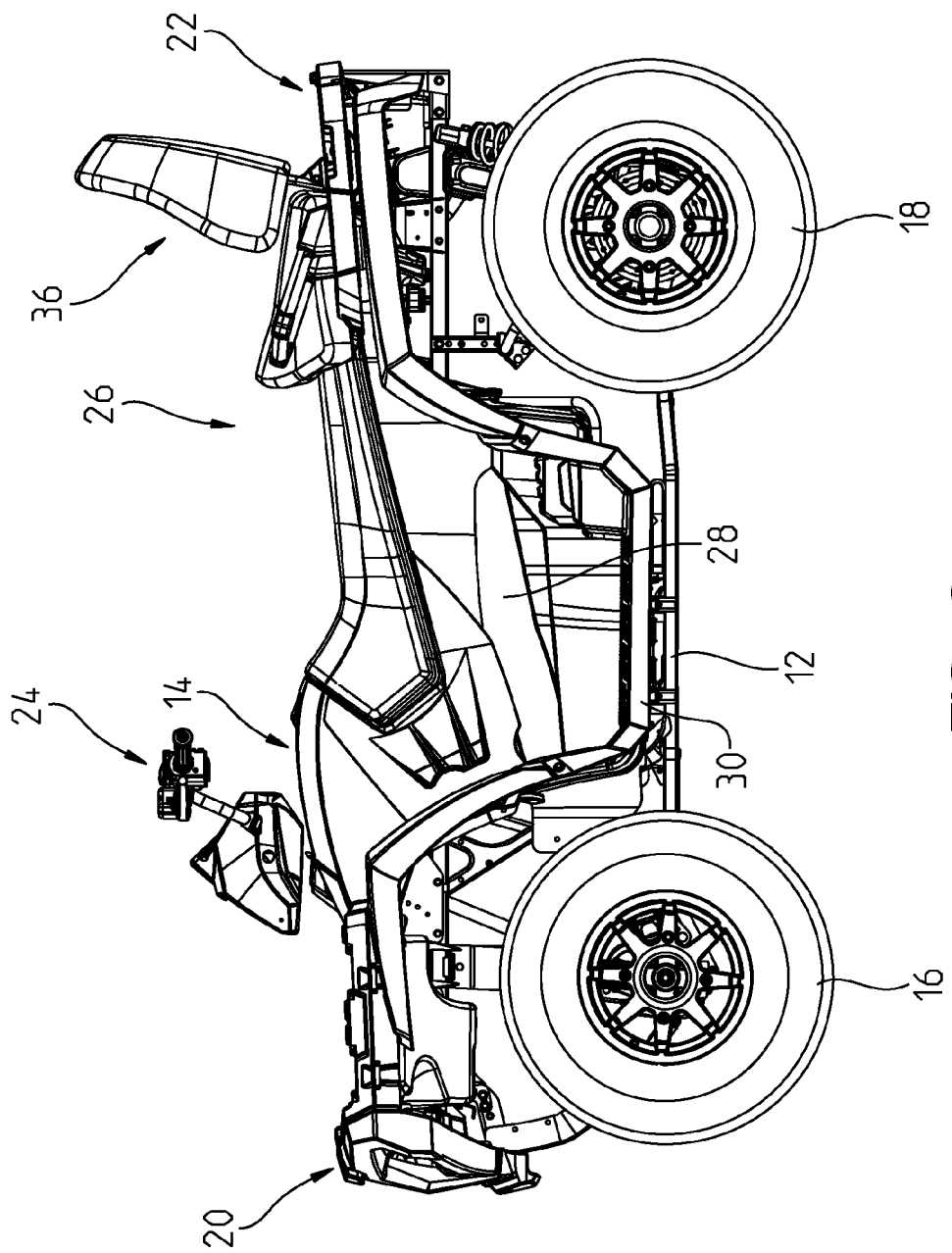
FIG. 2 is a left side plan view of the vehicle of FIG. 1.
Figure 3:
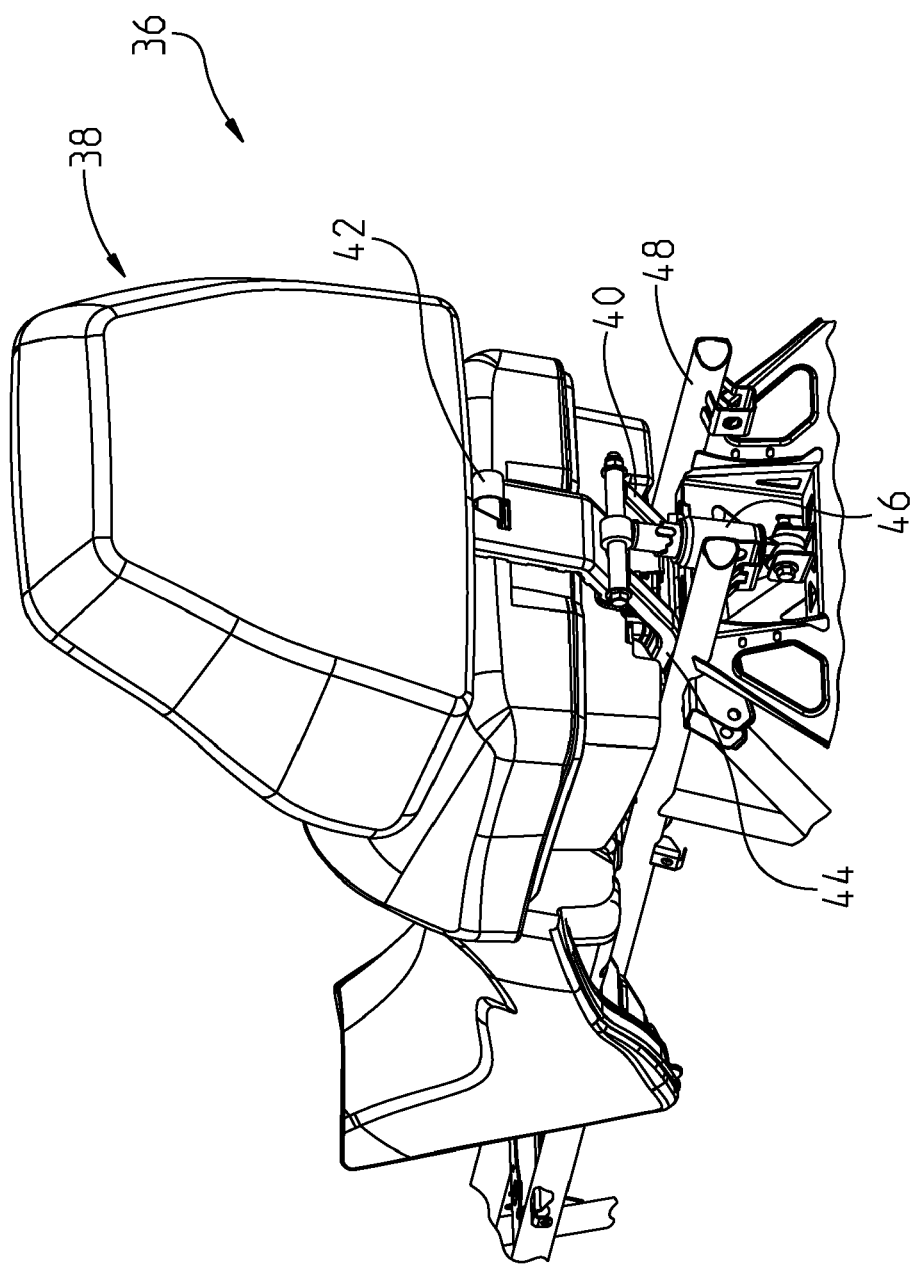
FIG. 3 is a rear perspective view in partial cutaway showing the passenger seat attached to the vehicle frame.

Referring initially to FIGS. 1-3, one illustrative embodiment of an all terrain vehicle (ATV) 10 is shown, ATV 10 includes a frame 12, a chassis 14 mounted on the frame 12, where the frame 12 is supported by front and rear tires 16, 18, respectively. ATV 10 also includes a front end 20 and a rear end 22. Front end 20 and rear end 22 are separated by handlebar assembly 24, straddle-type seat 26, drive-train 28, and foot-wells 30. Foot-wells 30 are located on both lateral sides of ATV 10, and flank the straddle-type seat 26, providing an area for the foot rest of the driver and passenger's feet.

Front end 20 also includes front accessory panel 32 which may include a tool storage compartment. Handlebar assembly 24 is operably coupled to front wheels 16 to allow a rider to steer ATV 10 when supported by straddle-type seat 26. Rear end 22 also includes rear accessory panel 34 which may also include a tool storage compartment. Front panel 32 and rear panel 34 may also include an accessory coupling system such as the one disclosed in U.S. Pat. No. 7,055,454, the disclosure of which is expressly incorporated herein by reference.

Positioned rearward of the straddle type seat 26 is a passenger support assembly 36, which is comprised of a passenger seat assembly 38, and a seat frame assembly 40 (FIG. 3). As described herein, passenger seat assembly 38 is selectively removable from the ATV 10 by way of a release mechanism 42. With the above generally described vehicle, the passenger support assembly will be described more fully below.

Figure 4:
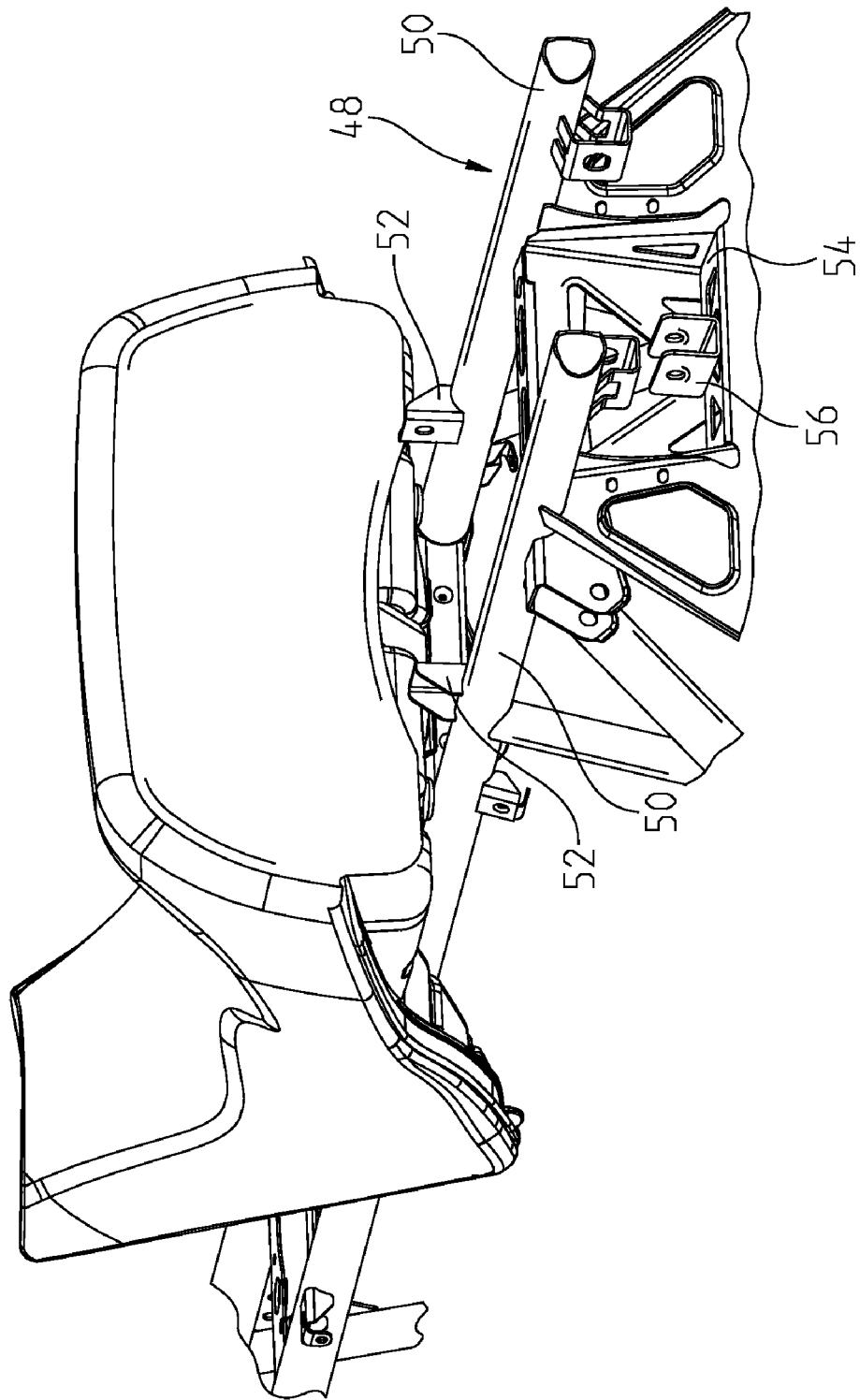
FIG. 4 is a view similar to that of FIG. 3, showing the passenger seat assembly removed.

With respect to FIGS. 3-4, seat frame assembly 40 is comprised of a pivot support link 44 and a suspension coupling 46, both of which are attached to a rear portion 48 of vehicle frame 12. As best viewed in FIG. 4, rear frame portion 48 is comprised of main frame tubes 50 having mounting brackets 52 positioned on opposing main frame tubes 50. Rear portion 48 is further comprised of a rear support platform 54 supporting mounting bracket 56, which supports suspension coupling 46 (FIG. 3), as described herein.

Figure 5:
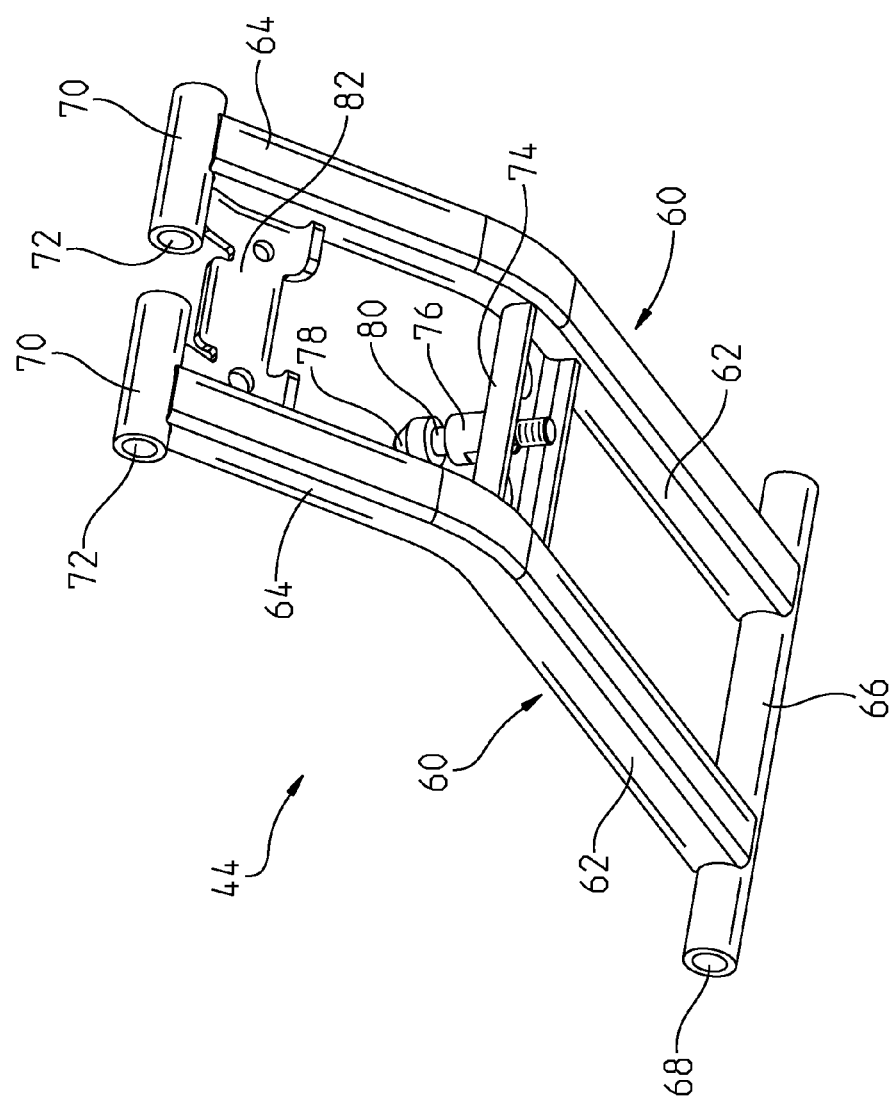
FIG. 5 is a perspective view of the pivot support link shown in FIG. 3.

With reference now to FIG. 5, pivot support link 44 is shown in greater detail. Pivot support link 44 is comprised of frame members 60 having a generally horizontal portion 62 and upright portions 64. A mounting axle 66 connects the frame members 60 at one end and includes a through opening 68 for mounting purposes. Meanwhile, axle portions 70 are mounted to the free ends of upright frame portions 64 where the axle portions 70 are spaced apart for receipt of the suspension coupling 46 as described herein. Each of the axle portions 70 includes an opening 72 as also described further herein. Pivot support link 44 further includes a bracket 74 interconnecting the frame members 60 and has a pin latching 76 attached thereto where the pin is comprised of a lead-in section 78 and an undercut latching area 80. Finally, pivot support link 44 includes a bracket 82 extending between the frame members 60 adjacent to the axle portions 70 forming a stop surface, as described herein.

Figure 6:
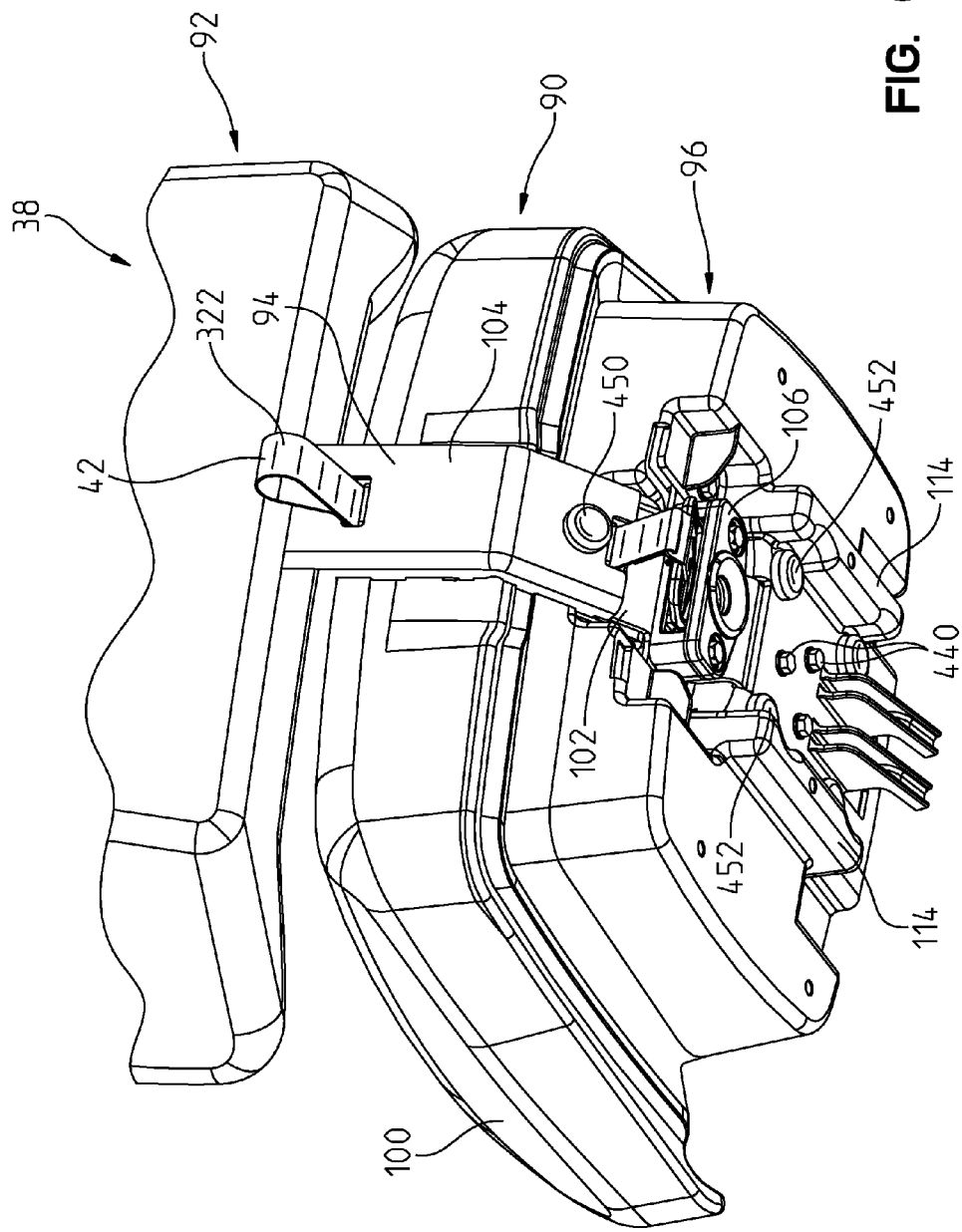
FIG. 6 shows an underside perspective view of the passenger seat assembly.

With reference now to FIG. 6, passenger seat assembly 38 is comprised of a seat bottom 90 and a seat back 92 where the seat back 92 is attached to the seat bottom 90 by way of a seat back support 94. The seat bottom 90 is comprised of a seat bottom frame 96 together with the appropriate seat padding shown generally at 100. The seat back support 94 includes a lower seat back frame 102 and an upper seat back frame 104. The release mechanism 42 includes latch assembly 106 which is attached to seat bottom frame 96 by way of connection to lower seat back frame 102 as described herein.

Figure 7:
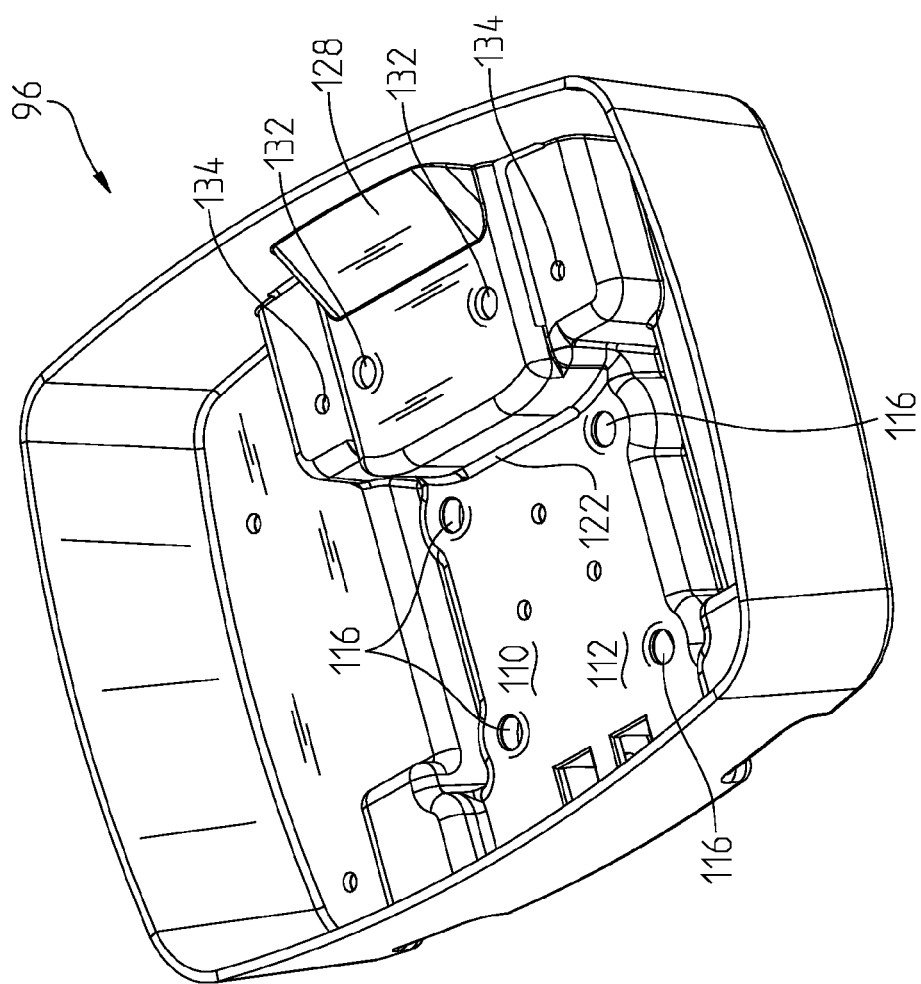
FIG. 7 is a shows a top perspective view of the seat frame.
Figure 8:
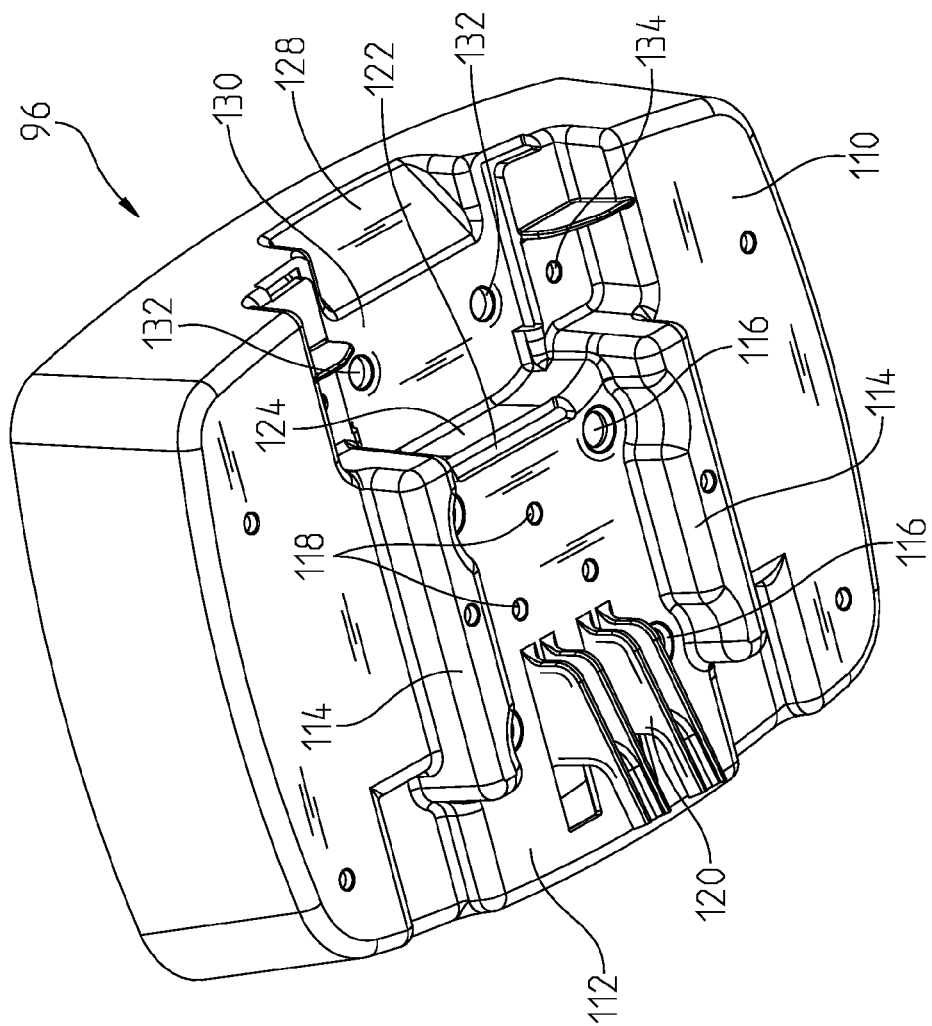
FIG. 8 is a lower perspective view of the seat frame of FIG. 7.
Figure 9:
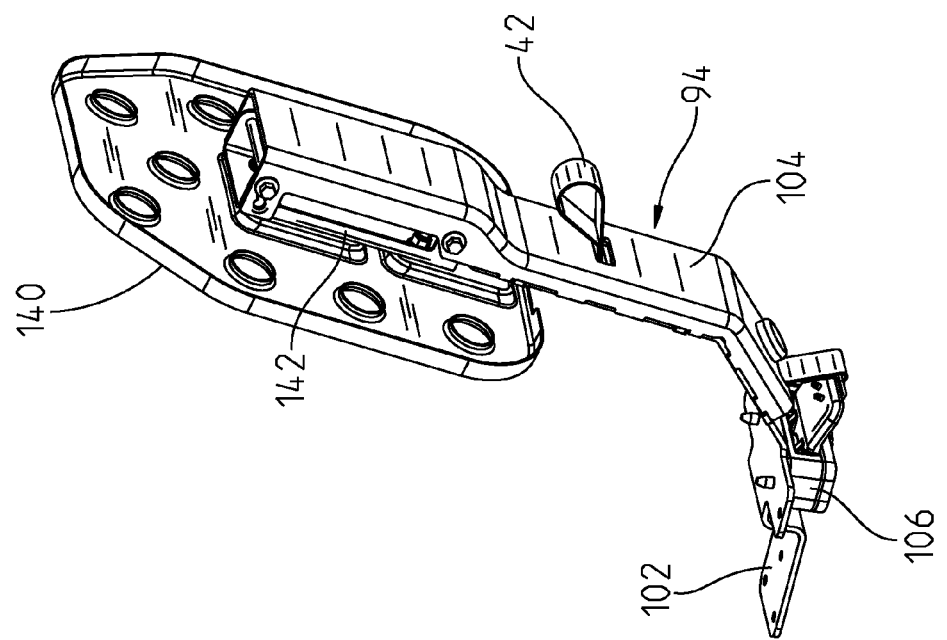
FIG. 9 shows a rear perspective view of the seat back and seat attachment assembly.
Figure 10:
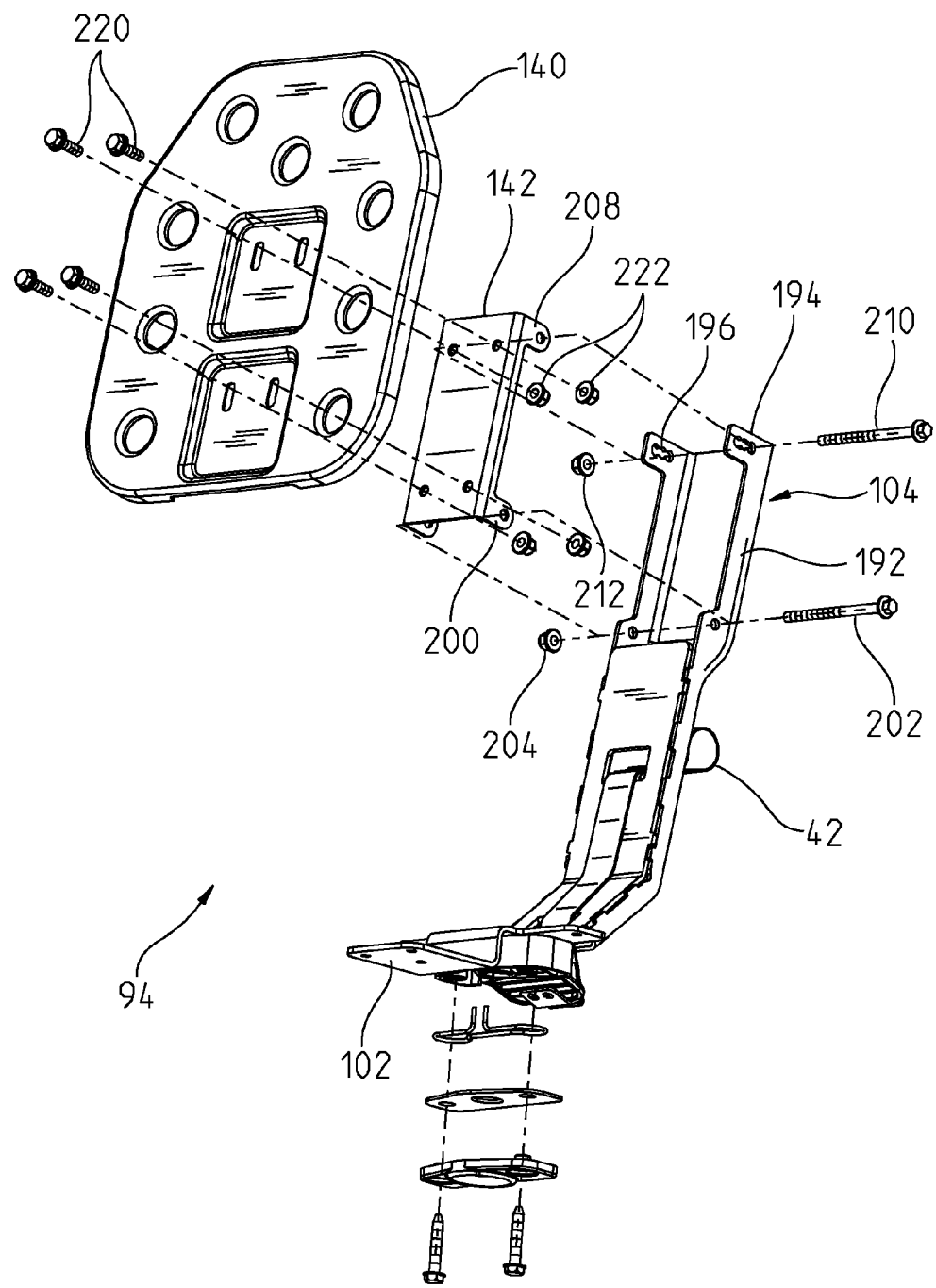
FIG. 10 shows a partially exploded view of the seat back and seat attachment assembly of FIG. 9.
Figure 11:
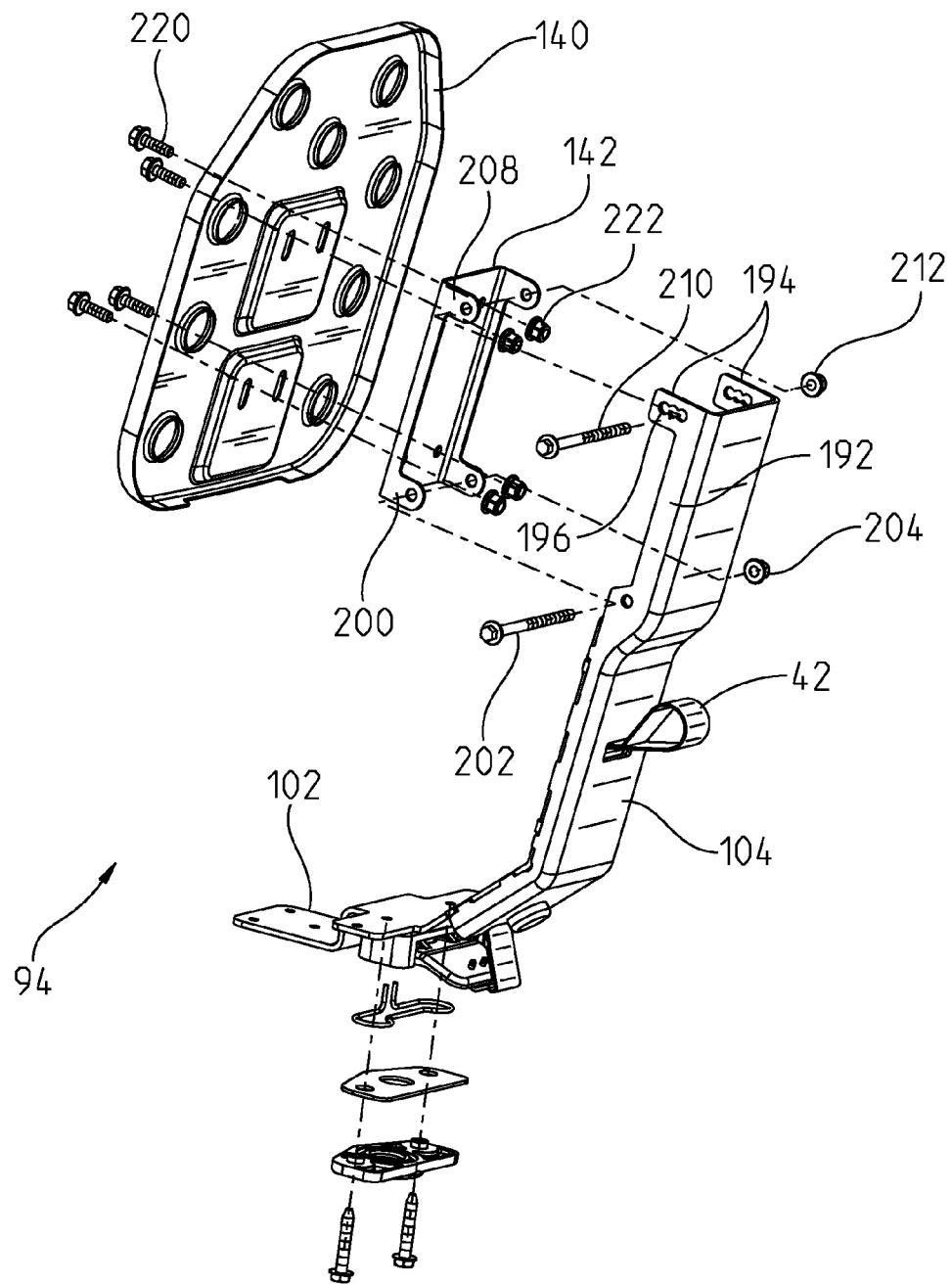
FIG. 11 shows a rear perspective view of the assembly of FIG. 10.

With respect now to FIGS. 7 and 8, the seat bottom frame 96 is shown in greater detail. Seat bottom frame portion 96 includes a lower wall 110 having a central wall portion 112 separated by way of alignment ribs 114. Alignment ribs 114 are used for alignment with pivot support link 44 as will be described herein. Central wall portion 112 further includes openings at 116 and through holes 118. Locking hooks 120 are integrally molded to the central wall portion 112 whereas a slot 122 is molded through a wall portion 124 to access an inside of central wall portion 112 as best shown in FIG. 7. The seat bottom frame 96 further includes a transition wall 128 leading onto a surface 130 having apertures 132 and mounting apertures 134.

Figure 13:
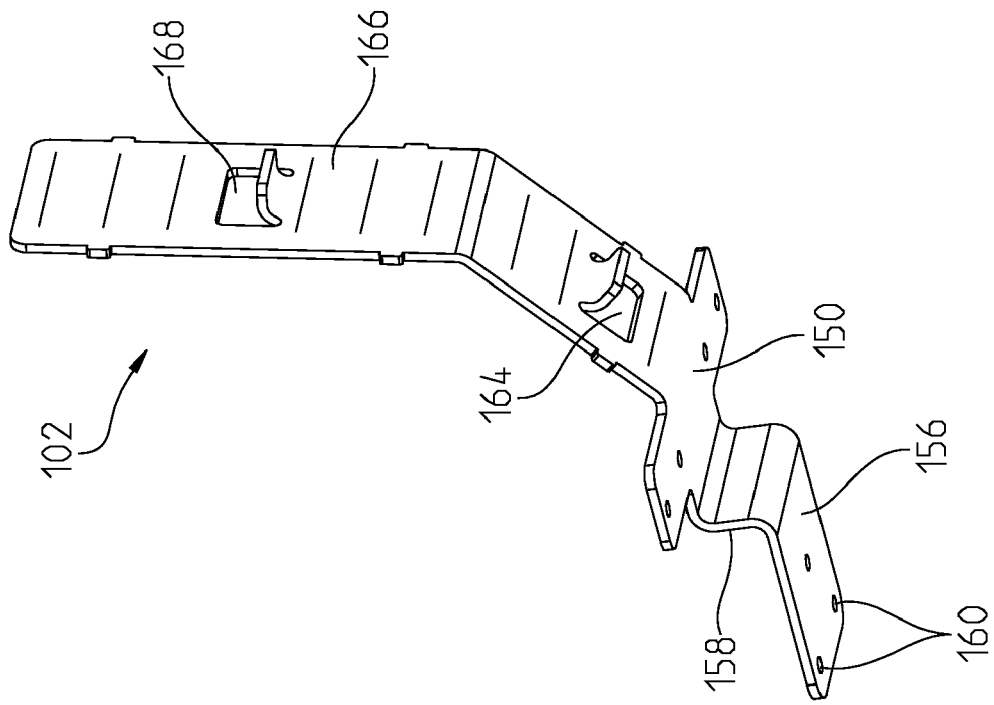
FIGS. 12 and 13 show front and rear perspective views of the lower seat back frame.
Figure 12:
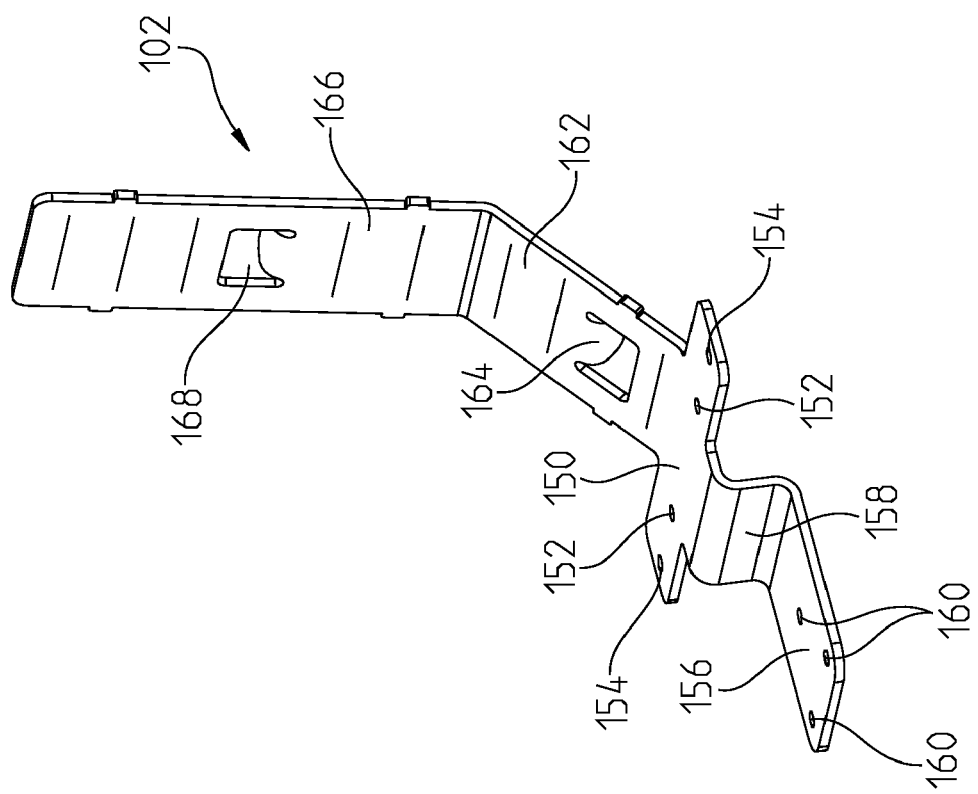

With respect now to FIGS. 9-13, seat back support 94 is shown with the lower seat back frame 102 and upper seat back frame 104 attached to a seat back platform 140 by way of a bracket 142. As shown in FIGS. 12 and 13, lower seat back frame 102 includes a base portion 150 having inner apertures 152 and outer apertures 154. A mounting plate portion 156 is positioned in a different plane as base portion 150 by way of a transition section 158. Mounting plate portion 156 includes mounting apertures 160. A transition wall 162 extends upwardly from base portion 150 and includes an opening 164. Finally an upright portion 166 is provided having an opening at 168.

Upper seat back frame 104 is shown in FIGS. 14 and 15 and includes an angled wall 170 for covering wall 162 and has marginal walls 172 for overlapping wall 162. Upper seat back frame 104 further includes a vertical wall portion 174 for covering wall portion 166 and includes marginal wall portions 176 for overlapping wall portion 166. A lower cutout section is provided at 180 and an upper cutout section is provided at 182 which are generally aligned with openings 164 and 168 (FIGS. 12 and 13) as described further herein. An upper wall portion 190 is provided having marginal wall portions 192 with mounting tab portions 194 positioned adjacent to a top of marginal wall portions 192. Intersecting circular apertures 196 are provided in tab portions 194 and provide closely spaced apertures as described herein. Finally, as shown in FIG. 15, angled wall 170 includes an aperture 198, as described herein.

With reference again to FIGS. 10 and 11, mounting bracket 142 includes mounting ears 200 which are profiled for receipt within marginal wall portions 192 and for attachment by way of a fasteners 202, 204. Meanwhile, bracket 142 includes upper ears 208 which may be positioned inside of tabs 194 such that the aperture in ear 208 may be aligned with one of the circular openings of the openings 196 and can be locked into one of multiple positions by way of fasteners 210, 212. Meanwhile seat back plate 140 may be attached to the bracket 142 by way of fasteners 220, 222.

Figure 16:
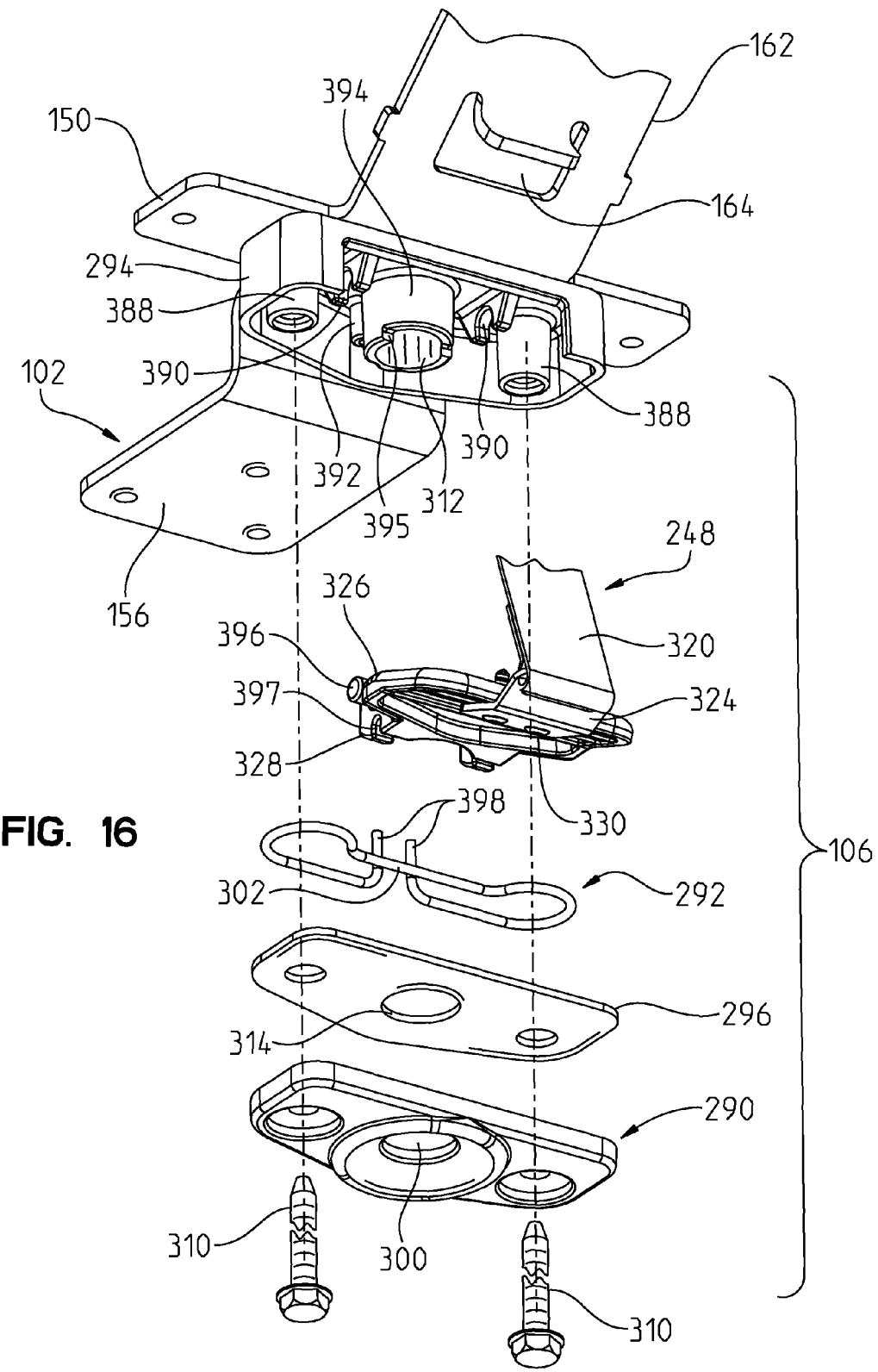
FIG. 16 shows an exploded view of an underside of a portion of the passenger seat assembly, and in particular the latch assembly.

With reference now to FIG. 16, latch assembly 106 includes a lanyard assembly 248, receiver plate 290, latch spring 292, spring block 294 and back up plate 296. Receiver plate 290 includes a pin receiving aperture 300, and spring 292 includes a spring portion 302 overlapping aperture 300. Block 294 and back up plate 296 also include throughholes 312, 314, respectively, which align with aperture 300 as described herein. With reference still to FIG. 16, lanyard assembly 248 includes a strap 320 having a pull loop 322 (FIG. 6) at one end and a connection link 324 at the opposite end. Link 324 is connected to release member 326 having engagement members 328 as will be described herein. Link 324 and release member 326 are attached together by way of rivets 330.

With reference still to FIG. 16, block 294 includes bosses 388 profiled to receive fasteners 310 therethrough. Block 294 further also includes U-shaped channels 390, posts 392, and a central post 394 which forms opening 312, and where post 394 is formed with a cut-away portion 395. As also shown in FIG. 16, release member 326 includes trunnions 396 on each side thereof, and are profiled for receipt within the U-shaped channels 390. The engagement members 328 include gripping channels 397. Finally, spring 292 includes clip ends 398. Thus as shown, lanyard assembly 248, receiver plate 290, spring 292, block 294 and back up plate 296 stack together and may be fastened to base portion 150 by way of fasteners 310 threadably engaging threaded apertures 152 (FIG. 12).

The spring latch assembly 106 is assembled as follows: strap 320 and link 324 are first attached to release member 326 by way of rivets 330. Trunnions 396 are then positioned in U-shaped channels 390. Spring 292 is positioned with spring portion 302 positioned in cutaway 395 and in gripping channels 397, and with clip ends 398 positioned within posts 392. Receiver plate 290 and back-up plate 296 are then positioned over bosses 388, and fasteners 310 may be received therethrough and threaded into the threaded openings 152 (FIG. 12), to retain the assembly in place to the base portion 150. The seat back support 94 is completed by positioning the upper seat back frame 104 to the lower seat back frame 102 and attaching the seat back platform 140 to the upper seat back frame 104 by way of bracket 142 as described herein.

With reference still to FIG. 16, fasteners 310 are positioned through receiver plate 290 and with spring 292 positioned on the plate 290, fasteners can extend through the block 294, and back up plate 296, and are attached to base portion 150. It should be appreciated that release member 326 is moveably trapped between plate 290 and block 294. It should also be appreciated that strap 320 is laced through aperture 164 and exits through aperture 168 to position loop 322 on the backside of seat 38 as shown in FIG. 6.

The passenger seat assembly is completed by placing the mounting plate 156 (FIG. 12) of the lower seat back frame 102 through the slot 122 (FIGS. 7-9) so as to align apertures 160 and 118. As apertures 160 are threaded, bolts 440 (FIG. 6) may be positioned through apertures 118 and into threaded engagement with the mounting plate 156. As shown in FIG. 6, this places the transition wall 162 (FIG. 12) adjacent to transition wall 128 (FIG. 8) with upright portion 166 and upper wall portion 190 extending upwardly from the seat bottom 90 as shown in FIG. 6. With reference still to FIG. 6, a rubber bushing 450 is positioned in aperture 198 (FIG. 15), and rubber bushings 452 are positioned in apertures 116 (FIG. 7).

Figure 17:
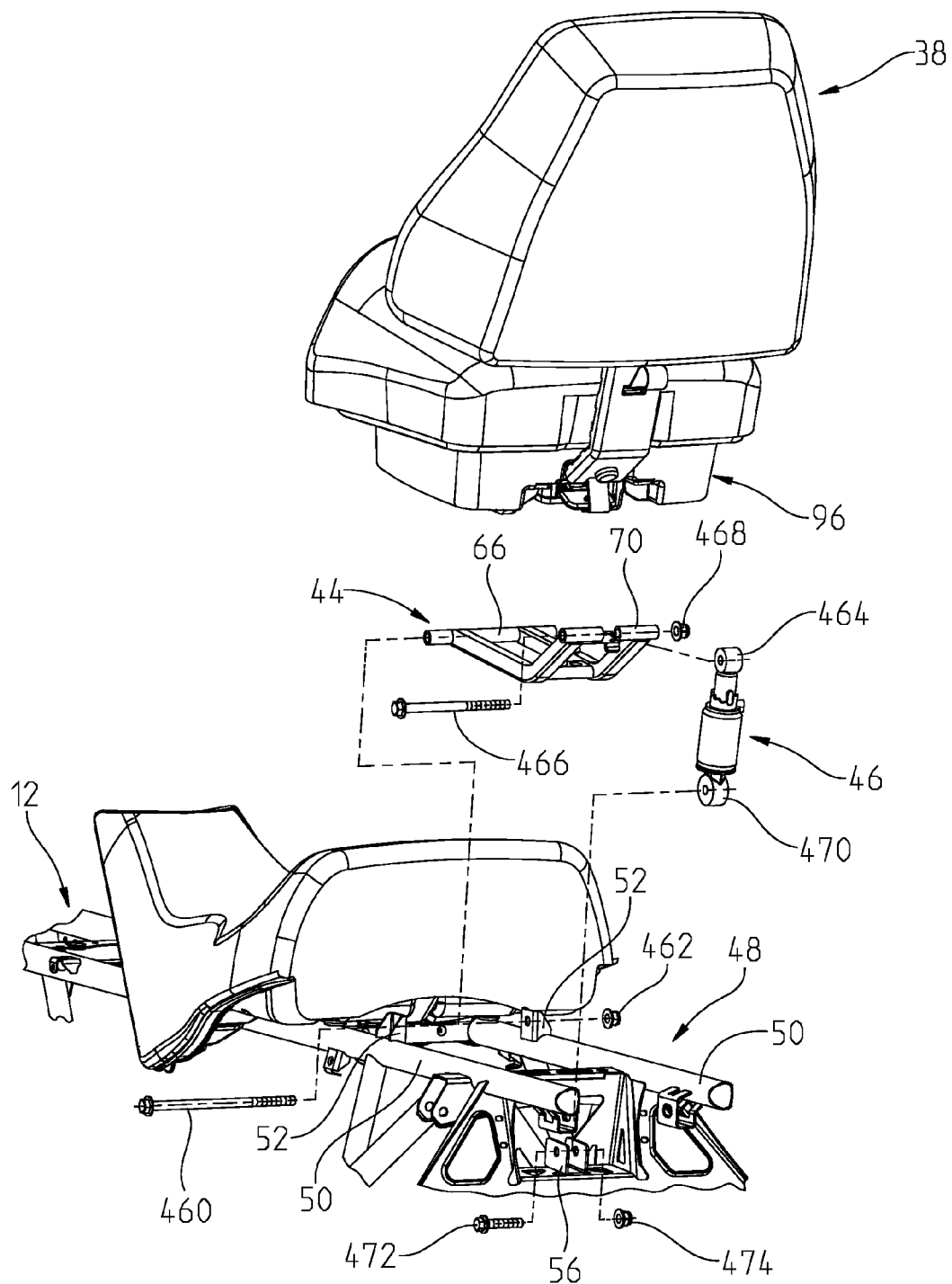
FIG. 17 shows the pivot link and passenger seat poised for receipt onto the frame rearward of the driver seat.

With reference now to FIG. 17, pivot support link 44 and suspension coupling 46 may now be attached to rear portion 48 of frame 12. Mounting axle 66 is positioned between mounting brackets 52 and elongate fastener such as a bolt or a stud 460 is positioned between brackets 52 and into and through mounting axle 66 whereby it may be attached with a fastener such as a nut 462. Suspension coupling 46 has an upper connection link 464 which may be placed intermediate axle portions 70 and receive a fastener such as a bolt or stud 466 therethrough and be retained by a nut 468. Meanwhile, suspension coupling 46 includes a lower coupling 470 which is now positioned in bracket 56 and attached thereto by way of fasteners 472, 474. As such, pivot support link 44 is moveable relative to rear portion 48 of frame 12 by way of dampened movement subject to the dampening of the suspension coupling 46.

Figure 18:
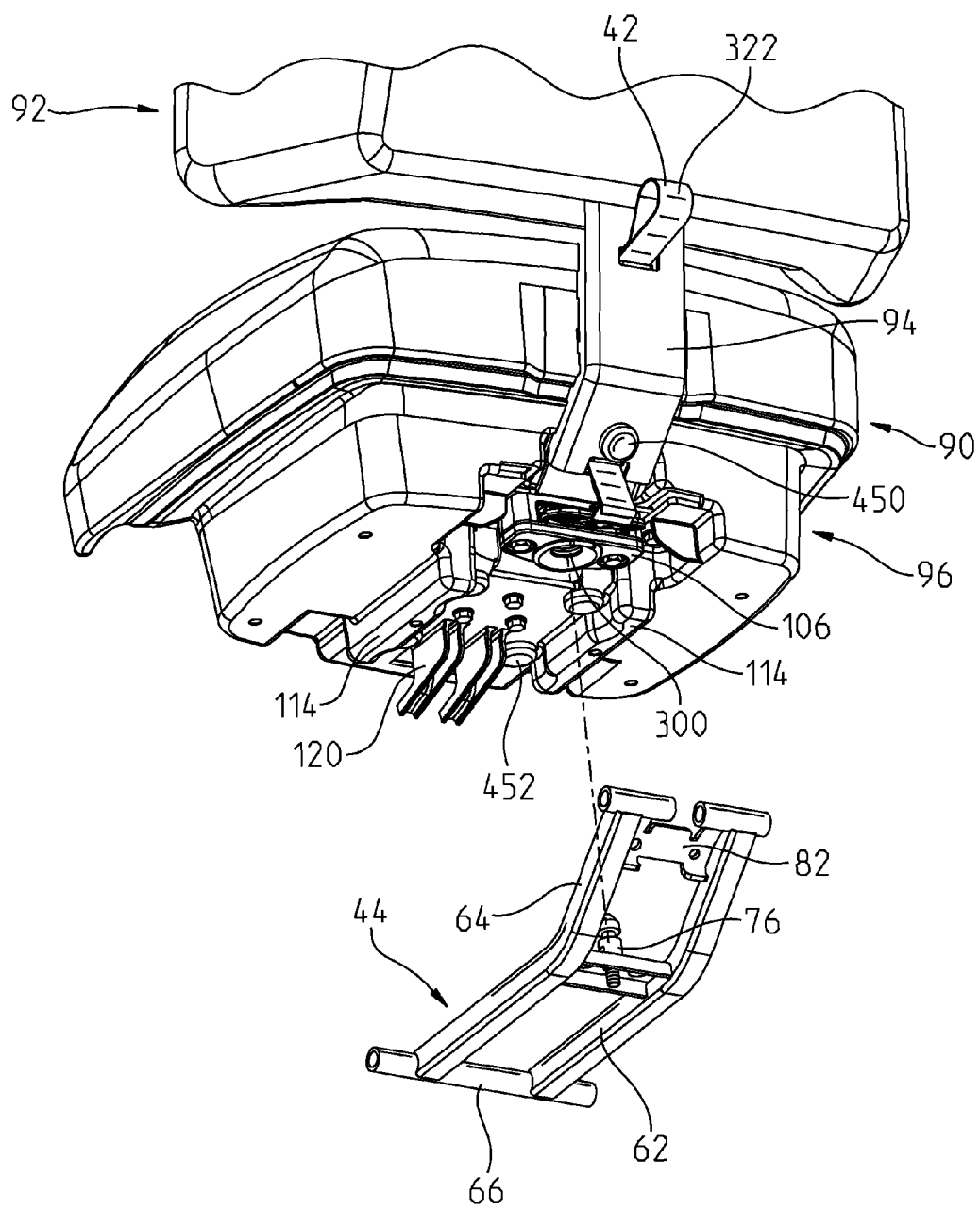
FIG. 18 shows an underside perspective view of the passenger seat assembly poised for receipt over the mating pin on the pivot support link.
Figure 19:
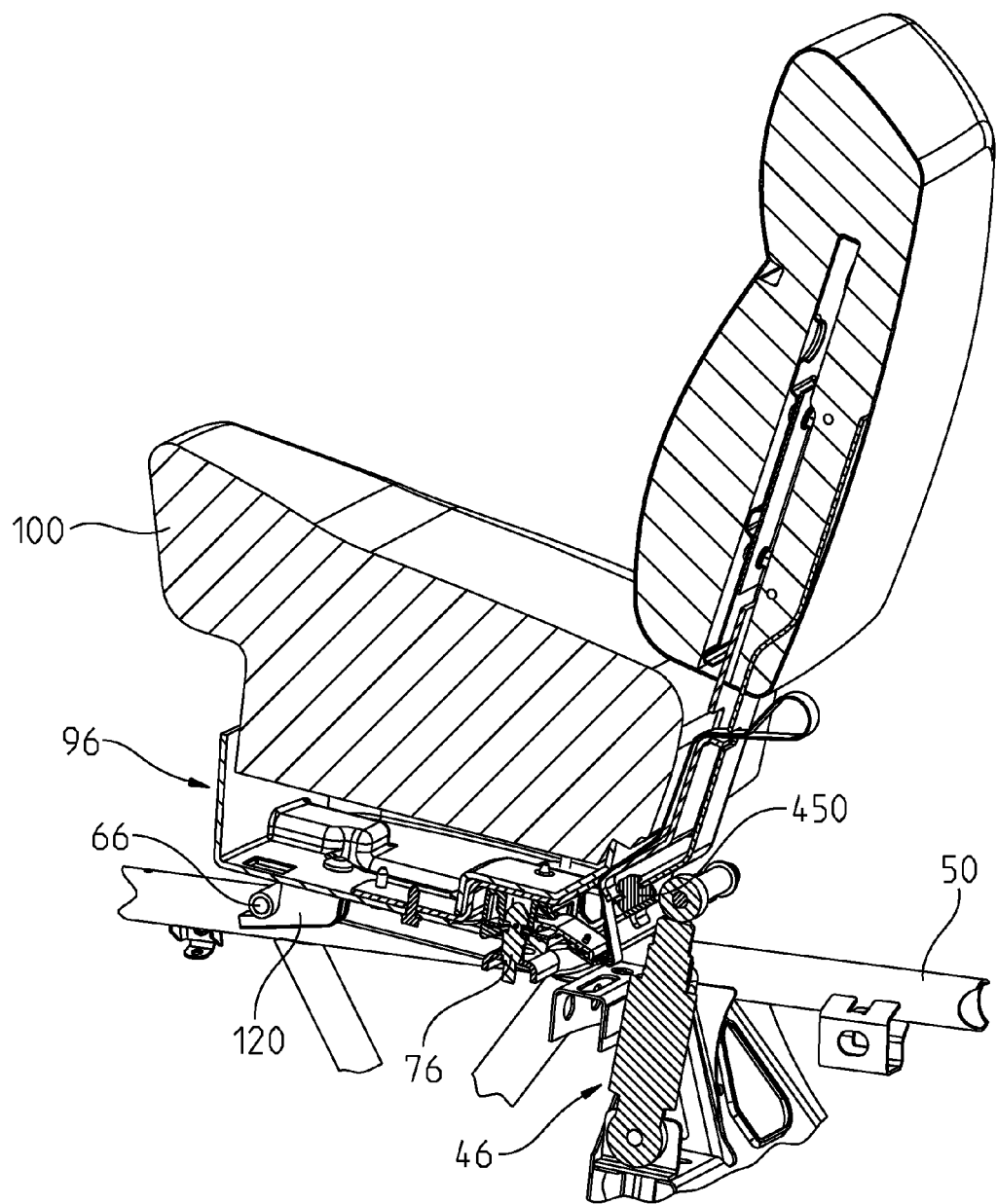
FIG. 19 is a longitudinal cross-sectional view taken through the shock absorber, in perspective view.
Figure 20:
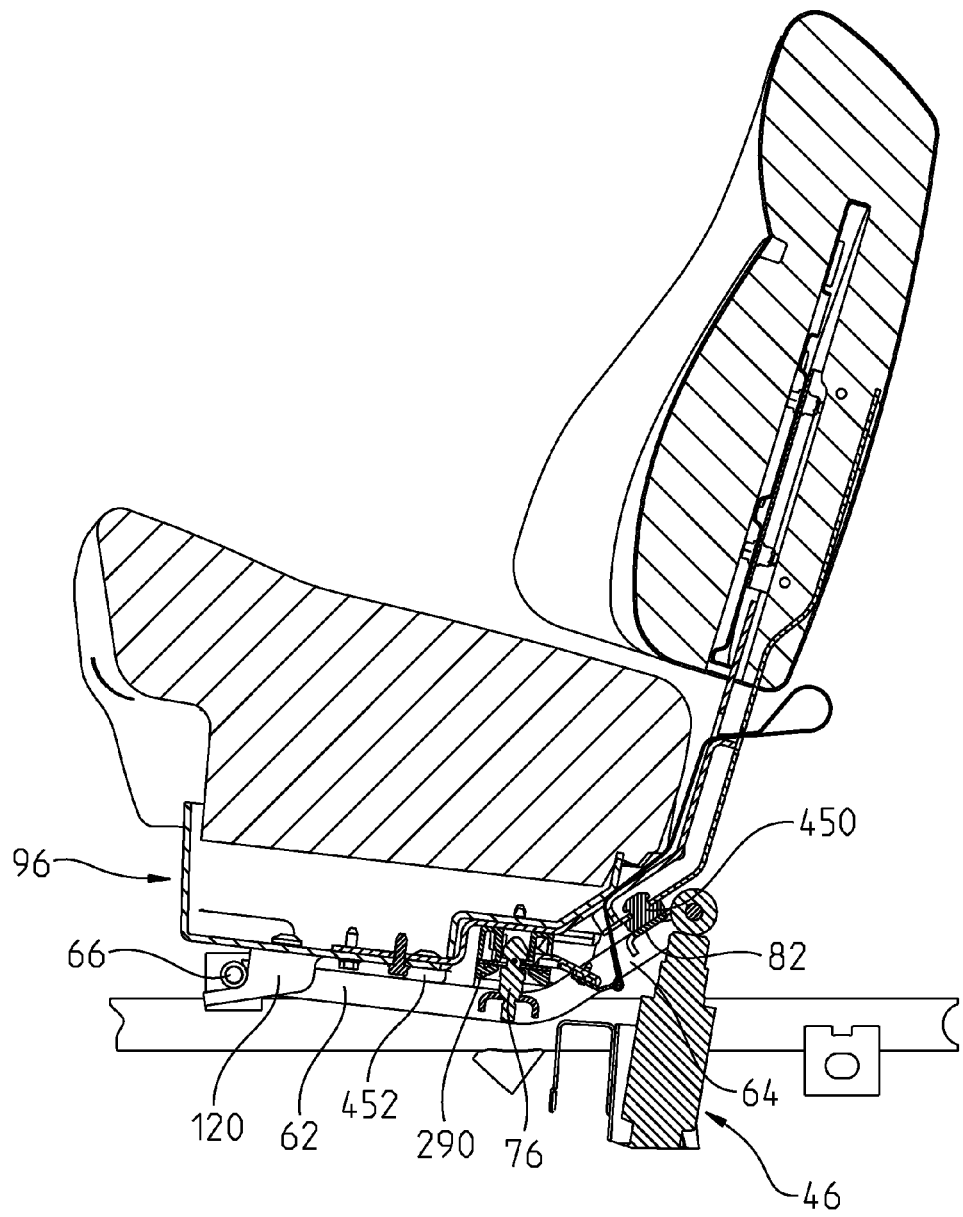
FIG. 20 is a longitudinal cross-sectional view taken through the shock absorber.

Thus as described and with reference now to FIGS. 18-20, seat assembly 38 is attached to vehicle 10 by positioning seat frame 96 against the pivot support link 44, such that the mounting hooks 120 couple around the axle 66 and such that the alignment ribs 114 flank the frame members 60. The attached position is shown in FIGS. 19 and 20. This aligns the pin 76 with opening 300 (FIG. 18) in receiving plate 290, as shown in FIG. 20. It should be appreciated that when pin 76 is aligned with opening 300, spring portion 302 resiles into an undercut latching area 80 of the pin latching 76 (FIG. 5) to retain the passenger seat assembly 38 in position. When the seat needs to be removed, loop 322 of strap 320 is pulled which causes release plate 326 to rotate about trunnions 396 (FIG. 16). Gripping channels 397 grip spring portion 302 and disengage spring 292 from undercut latching area 80, which allows the seat to pull straight off of pin 76, and then rotate out.

It should be noted that the movable portion of the latch assembly 106, that is release member 326 and spring 292, are movably attached to the seat. It should also be noted that lanyard strap 320 is pulled generally vertically to release the latch assembly 106 from the pin 76. Therefore, the directional component of the force on the lanyard 320 assists in the removal of the passenger seat assembly 38. As mentioned above, isolation mounts 450, 452 on the seat bracket support 94 are positioned against bracket 82 and the horizontal portions 62 of the frame members 60 of the pivot support link 44, respectively, and provide for vibration dampening between the seat bracket support 94 and the pivot support link 44.

Figure 21:
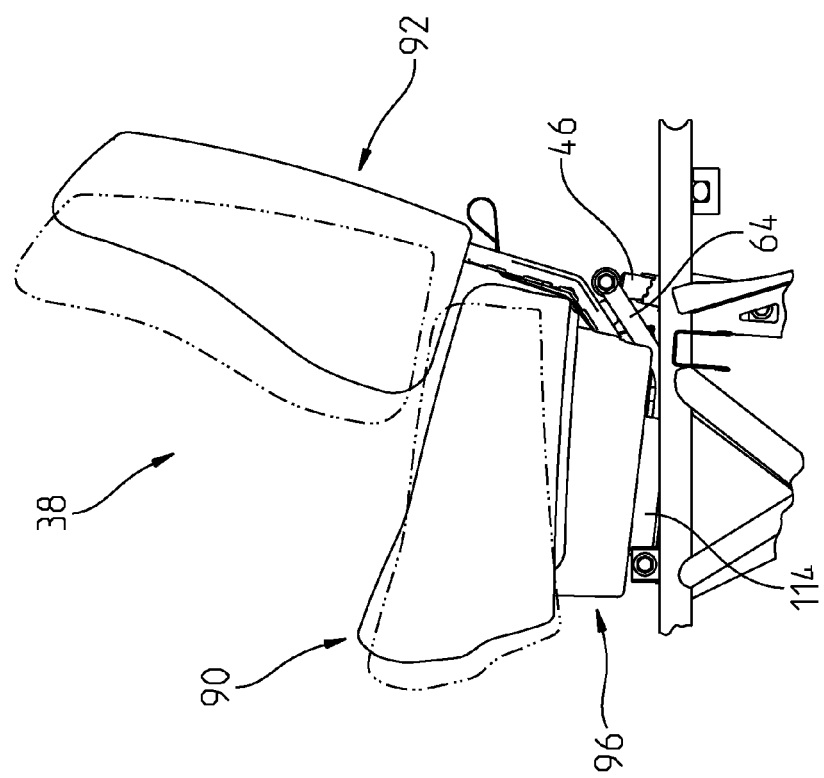
FIG. 21 shows a side plan view of the passenger seat assembly showing the extreme positions of the passenger seat through the dampening.

At the same time, the entire pivot support link 44 is attached to the frame 12 of the vehicle 10 in a dampened manner by way of suspension coupling 46. Suspension coupling 46 is comprised of at least one element acting along a linear path, such as a shock absorber, damper, air shock, shock and spring combination, or other linear force element (LFE). Thus any vibration or bumps encountered by the vehicle 10 will be dampened by the suspension coupling 46, rather than being transferred to the passenger seat assembly 38. FIG. 21 displays the extreme positions available given the stroke of the suspension coupling 46. As also shown in FIG. 21, the upward projection of frame portions 64 provides more vertical clearance for the suspension coupling 46, thus allowing maximum vertical stroke.

Figure 22:
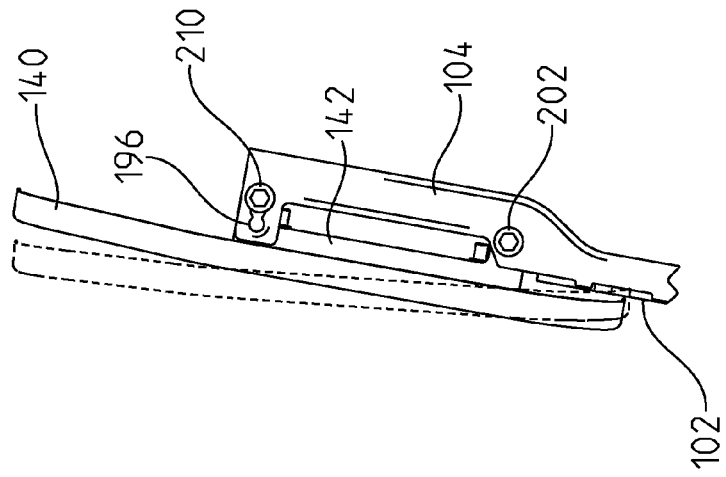
FIG. 22 shows the extreme positions of the seat back plate for the passenger seat.

As also shown in FIG. 22, the seat back platform 140 is movable by way of the fasteners 202, 210 between the position shown. Thus the entire seat back 92 may be moved between these positions to accommodate the best ergonomic fit for the passenger. While not shown, some access means, such as a zipper or other opening could be positioned in the padding or covering of the seat back 92, and adjacent to the fasteners 202, 210, for access and adjustment of the seat back platform 140.

What is claimed is:

1. A vehicle comprising:
a frame including a longitudinally-extending first frame member and a longitudinally-extending second frame member parallel to the first frame member;
a straddle type seat mounted to the frame for a driver;
a passenger support assembly positioned rearward of the straddle type seat and being movable relative to the frame in dampened movement in at least a partially vertical travel component, the passenger support assembly including:
a passenger seat assembly; and
a seat frame assembly having a first end and a second end, the first end of the seat frame assembly being pivotally coupled between the first and second frame members of the vehicle, at least a portion of the seat frame assembly being positioned below a top surface of the first and second frame members and along an inner surface of the frame members; and
at least one linear force element (LFE) having an upper end and a lower end, the upper end being pivotally coupled to the second end of the seat frame assembly and the lower end being coupled to the frame, the seat frame assembly being intermediate the passenger seat assembly and the LFE such that the LFE is spaced apart from the passenger seat assembly.

2. The vehicle of claim 1, wherein the passenger support assembly is dampened by way of the at least one LFE.

3. The vehicle of claim 2, wherein the LFE is a shock absorber.

4. The vehicle of claim 1, wherein the first end of the seat frame assembly is pivotably mounted at a pivot position adjacent to the straddle type seat.

5. The vehicle of claim 4, wherein the seat frame assembly is comprised of at least one lower frame portion extending under the passenger seat assembly, and at least one upper frame portion suspended above the frame by way of the at least one linear force element (LFE).

6. The vehicle of claim 5, wherein the at least one upper frame portion angles upwardly and rearwardly adjacent the passenger seat assembly.

7. The vehicle of claim 6, wherein the passenger seat assembly is removably mounted to the seat frame assembly.

8. A vehicle comprising:
a vehicle frame;
a straddle type seat mounted to the vehicle frame for a driver; and
a passenger support assembly positioned rearward of the straddle type seat and being movable in dampened movement in at least a partially vertical travel component, the passenger support assembly including:
   a passenger seat assembly including a seat bottom, a seat back, and a support for coupling the seat bottom to the seat back, the support having a first portion extending under the seat bottom in a generally horizontal position and a second portion being positioned above the vehicle frame and integrally coupled to the seat back;
   a support link coupled to the passenger seat assembly and including a first end coupled to the frame of the vehicle and a second end; and
   at least one linear force element (LFE) being coupled to the second end of the support link in a mostly vertical position and capable of moving the passenger seat assembly and the support link in dampened movement.

9. The vehicle of claim 8, wherein the LFE is a shock absorber.

10. The vehicle of claim 8, wherein the second end of the support link angles upwardly and rearwardly adjacent the passenger seat assembly.

11. The vehicle of claim 8, wherein the passenger seat assembly is removably mounted to the support link.

12. The vehicle of claim 8, wherein the support link is pivotably mounted to the vehicle frame.

13. The vehicle of claim 12, wherein the support link is pivotably mounted at a pivot position adjacent to the straddle type seat.

14. A vehicle comprising:
a vehicle frame having a first frame member and a second frame member in parallel with the first frame member;
a straddle type seat mounted to the first and second frame members of the vehicle frame for a driver;
a passenger support assembly positioned rearward of the straddle type seat, the passenger support assembly being positioned intermediate the first and second frame members and being movable in dampened movement relative to the vehicle frame; and
at least one linear force element (LFE) positioned along a rear portion of the vehicle frame, wherein a portion of the at least one LFE extends below the first and second frame members.

15. The vehicle of claim 14, wherein the LFE is a shock absorber.

16. The vehicle of claim 14, wherein the passenger support assembly comprises:
a passenger seat assembly; and
a seat frame assembly coupled to the seat assembly and having a first frame portion and a second frame portion, the first frame portion extending horizontally under the passenger seat assembly and the second frame portion being angled upwardly and rearwardly adjacent the passenger seat assembly.

17. The vehicle of claim 16, wherein at least a portion of the LFE is positioned above the vehicle frame in a mostly vertical position, the LFE having an upper end and a lower end, the upper end being coupled to the second frame portion and the lower end being coupled to the vehicle frame.

18. The vehicle of claim 16, wherein the passenger seat assembly is removably mounted to the seat frame assembly.

19. The vehicle of claim 16, wherein the seat frame assembly is pivotably mounted to the vehicle frame.

20. The vehicle of claim 19, wherein the seat frame assembly is pivotably mounted at a pivot position adjacent to the straddle type seat.

* * * * *